(12) United States Patent
Beigman Klebanov et al.

(10) Patent No.: US 12,548,587 B1
(45) Date of Patent: Feb. 10, 2026

(54) SYSTEMS AND METHODS FOR MODELING IN-THE-MOMENT LEXICAL EXPERIENCE FOR TRACKING ORAL READING FLUENCY

(71) Applicant: Educational Testing Service, Princeton, NJ (US)

(72) Inventors: Beata Beigman Klebanov, Hopewell, NJ (US); Michael Suhan, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 247 days.

(21) Appl. No.: 18/357,257

(22) Filed: Jul. 24, 2023

Related U.S. Application Data

(60) Provisional application No. 63/391,899, filed on Jul. 25, 2022.

(51) Int. Cl.
   *G10L 25/51*   (2013.01)
   *G10L 15/22*   (2006.01)
   *G10L 15/26*   (2006.01)

(52) U.S. Cl.
   CPC ............ *G10L 25/51* (2013.01); *G10L 15/22* (2013.01); *G10L 15/26* (2013.01); *G10L 2015/225* (2013.01)

(58) Field of Classification Search
   CPC ......... G10L 15/26; G10L 25/51; G10L 15/22; G10L 2015/225
   See application file for complete search history.

(56) References Cited

U.S. PATENT DOCUMENTS 11,024,194 B1 * 6/2021 Beigman Klebanov ..................... G09B 17/04

OTHER PUBLICATIONS

Monsalve et al, ("Lexical Surprisal as a General Predictor of Reading Time,"(2012), In Proceedings of the 13th Conference of the European Chapter of the Association for Computational Linguistics, pp. 398-408, Avignon, France. Association for Computational Linguistics), (Year: 2012).*
Breland et al.; The College Board Vocabulary Study; ETS Report No. 94-26; College Entrance Examination Board; pp. 1-51; 1994.
Landauer, Thomas, Foltz, Peter, Laham, Darrell; Introduction to Latent Semantic Analysis; Discourse Processes, 25; pp. 259-284; 1998.
Terzopoulos et al.; HelexKids: A word frequency database for Greek and Cypriot primary school children; Behavior Research Methods, 49(1); pp. 83-96; 2017.

(Continued)

*Primary Examiner* — Angela A Armstrong
(74) *Attorney, Agent, or Firm* — Jones Day

(57) ABSTRACT

Systems and methods are provided for modeling lexical experience for tracking of oral reading fluency. In embodiments, a background corpus and a text are received. A reading passage is selected from the text. A surprisal model is generated based on the background corpus and a portion of the text preceding the reading passage. An audio of a user reciting the reading passage is iteratively received, wherein a token of the audio from a plurality of tokens is received at a time. Oral reading fluency is evaluated based on the audio and the surprisal mode. The next reading passage is selected. An oral reading fluency report is stored in a computer readable medium.

22 Claims, 16 Drawing Sheets

(56) References Cited

OTHER PUBLICATIONS

Tribus, Myron; Information Theory as the Basis for Thermostatics and Thermodynamics; Journal of Applied Mechanics, 28(1); pp. 1-8; 1961.
Zeno, Susan, Ivens, Stephen, Millard, Robert, Duvvuri, Raj; The Educator's Word Frequency Guide; Brewster, NY: Touchstone Applied Science Associates; 1995.

* cited by examiner

| Corpus | # tokens | # types |
|--------|----------|---------|
| TASA3 | 2,692,335 | 32,732 |
| SFI | 14,418,651 | 94,563 |
| BNC | 100,136,361 | 537,729 |
| SUBT | 49,719,560 | 73,609 |

*Fig. 8A*

| Book | # chapters | # passages | passage length mean (stdev) |
|------|-----------|-----------|------------------------------|
| HP | 17 | 315 | 246.83 (28.82) |
| Pinocchio | 19 | 162 | 241.75 (44.04) |

*Fig. 8B*

| Loc | HP | | Pinocchio | |
|---|---|---|---|---|
| | Word | Surp. | Word | Surp. |
| early | dursley | 21.20 | geppetto | 22.78 |
| | dursley | 20.97 | polendina | 22.78 |
| | dursley | 22.20 | antonio | 22.78 |
| | dursley | 21.78 | geppetto | 22.20 |
| | dursley | 21.46 | geppetto | 21.78 |
| | | | antonio | 22.20 |
| | | | polendina | 22.20 |
| | | | polendina | 21.78 |
| middle | hermione | 18.98 | tremble | 16.69 |
| | hermione | 18.93 | dolphin | 16.74 |
| | overhearing | 19.54 | marionette | 16.99 |
| | gryffindor | 19.20 | dolphin | 16.73 |
| | seamus | 20.33 | gait | 17.28 |
| | filch | 19.62 | fro | 17.41 |
| | sneering | 18.93 | idle | 16.86 |
| | | | tramp | 17.59 |
| late | wardrobes | 20.79 | snail | 17.0 |
| | greener | 19.54 | lizard | 16.06 |
| | tidier | 21.79 | bravo | 18.62 |
| | bertie | 21.79 | mischief | 16.65 |
| | bott | 21.79 | deserve | 15.96 |
| | muggle | 19.40 | praise | 15.91 |
| | wizened | 19.54 | models | 16.39 |
| | muggles | 19.54 | obedience | 17.64 |

Fig. 9

| Measure<br>Corpus | mean<br>HP/P | median<br>HP/P | stdev<br>HP/P | 97%<br>HP/P |
|---|---|---|---|---|
| TASA3 | -.21/-.18 | -.11/-.11 | -.26/-.24 | -.22/-.20 |
| TASA | -.23/-.20 | -.09/-.04 | -.35/-.27 | -.31/-.27 |
| SFI | -.14/-.16 | -.14/-.06 | -.26/-.28 | -.32/-.42 |
| BNC | -.13/-.16 | -.11/-.06 | -.18/-.25 | -.21/-.44 |
| SUBT | -.16/-.14 | -.16/-.08 | -.11/-.23 | -.29/-.28 |

Fig. 10

| | Dependent variable: wcpm | | | |
|---|---|---|---|---|
| | Baseline | | +Surprisal | |
| Grade 5 | 0.01 | (9.00) | 0.11 | (9.00) |
| TTS | 4.89*** | (0.94) | 3.54*** | (0.88) |
| TE | -3.17*** | (0.91) | -1.99*. | (0.85) |
| Chapter | 1.34*** | (0.16) | 1.15*** | (0.15) |
| Surprisal | | | -3.37*** | (0.76) |
| Constant | 98.74*** | (7.46) | 100.22*** | (7.43) |
| Note: | | *p<0.05; | **p<0.01; | ***p<0.001 |

Fig. 12

SYSTEMS AND METHODS FOR MODELING IN-THE-MOMENT LEXICAL EXPERIENCE FOR TRACKING ORAL READING FLUENCY

CROSS-REFERENCE TO RELATED APPLICATIONS

This application claims the benefit of U.S. Provisional Patent Application No. 63/391,899, filed Jul. 25, 2022, which is incorporated by reference herein in its entirety.

TECHNICAL FIELD

The technology described herein relates to modeling in-the-moment lexical experience for tracking oral reading fluency.

BACKGROUND

Teaching the skill of reading is one of the major tasks of an education system. Oral reading fluency (ORF) tests can serve as indicators of early literacy skills. Modeling a reader's dynamic lexical experience may provide improved ORF reports that take into account a reader's familiarity with words.

SUMMARY

Systems and methods are provided for a computer-implemented method for modeling lexical experience for tracking of oral reading fluency. An example system performs steps, including receiving a background corpus and a text and selecting a reading passage from the text. The example system further generates a surprisal model based on the background corpus and a portion of the text preceding the reading passage and iteratively receives audio of a user reciting the reading passage, wherein a token of audio from a plurality of tokens is received at a time. Then, the example system evaluates oral reading fluency based on the audio. The example system selects a next reading passage and stores an oral reading fluency report in a computer readable medium.

As another example, a method for modeling lexical experience for tracking of oral reading fluency is presented. A background corpus and a text are received. A reading passage from the text is selected. A surprisal model based on the background corpus and a portion of the text preceding the reading passage is generated. Audio of a user reciting the reading passage is iteratively received, wherein a token of audio from a plurality of tokens is received at time. Oral reading fluency is evaluated based on the audio and the surprisal model. A next reading passage is selected. An oral reading fluency report is stored in a computer readable medium.

As a further example, a computer-readable medium is encoded with instructions for commanding one or more data processors to execute a method for modeling lexical experience for tracking of oral reading fluency. The example method includes receiving a background corpus and a text and selecting a reading passage from the text. The example method further generates a surprisal model based on the background corpus and a portion of the text preceding the reading passage and iteratively receives audio of a user reciting the reading passage, wherein a token of audio from a plurality of tokens is received at a time. Then, the method performs additional steps, including evaluating oral reading fluency based on the audio and the surprisal model, selecting a next reading passage, and storing an oral reading fluency report in a computer readable medium.

BRIEF DESCRIPTION OF THE DRAWINGS

FIG. 8A is a table depicting the number of tokens and types for various background corpora.

FIG. 8B is a table depicting descriptive passage statics for two example books.

FIG. 9 is a table depicting example words in the top 3% of surprisal at different locations of each example book.

FIG. 10 is a table depicting the Pearson's correlations between the surprisal measures and the serial number of the passage in the book.

FIG. 12 is a table depicting the differences in results between a baseline oral reading fluency model and a model that includes surprisal.

DETAILED DESCRIPTION

Figure 1:
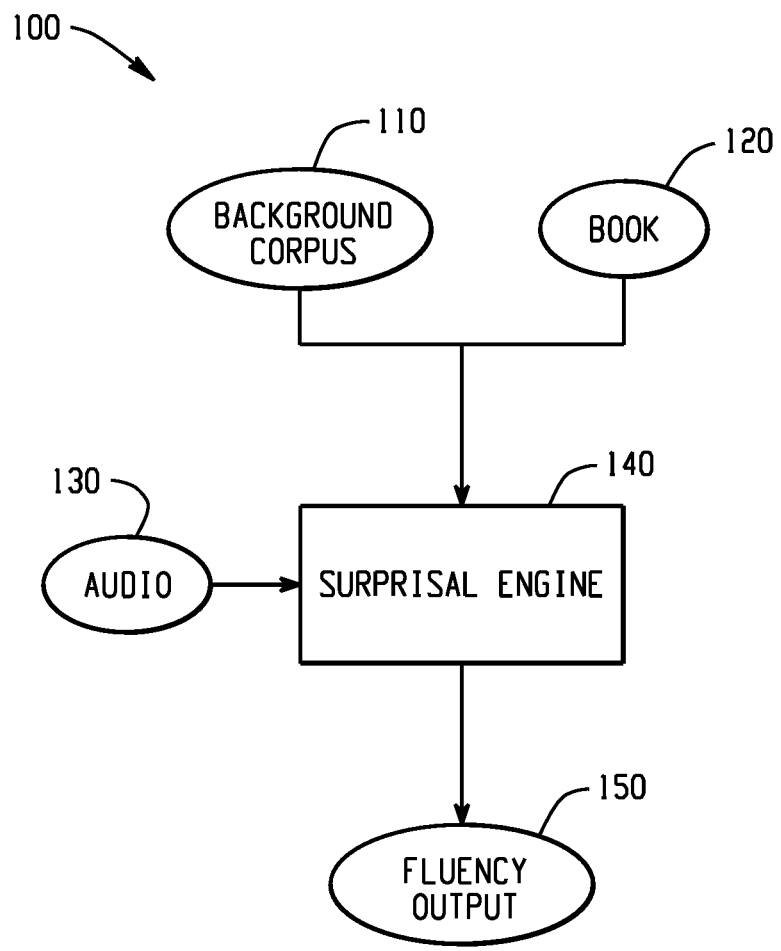
FIG. 1 is a diagram depicting an example system for modeling lexical experience for tracking oral reading fluency.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Teaching new language learners, such as young children, the skill of reading is one of the major tasks of an education system. In the U.S., a common solution to monitoring the development of reading skills is the periodic administration of ORF tests, where fluency scores can serve as indicators of early literacy skills. For example, a popular DIBELS (Dynamic Indicators of Basic Early Literacy Skills) test may be administered to students three times a year to measure progress. In a DIBELS test, a specific passage is given in a particular grade at a particular time. ORF is typically measured as words read correctly per minute of oral reading (wcpm), which accounts for both accuracy and speed. Each passage is normalized so that a student's performance could be mapped to a percentile score relative to peers.

One of the weaknesses of this system is the need to administer a specific, pre-set assessment passage. This may take time away from a student reading for learning and pleasure to read for a test. It may also take away agency from teachers and students in choosing what to read, where choice and interest may enhance engagement and performance. A reading application (e.g., a web or mobile application) can, in some instances, address these weaknesses by letting language learners read different books aloud as a learning-and-pleasure activity and measuring ORF in the background. Such a solution may also allow for more continuous monitoring, providing language learners more opportunities to evaluate their ORF skill.

One challenge with reading applications is creating passage-specific norms. Passage-specific norms help identify and take into account things other than the reader's fluency for variances in wcpm measurements. Passage effects may be a source of such variance. Passage effects may include text complexity, genre, local discourse structure, and prosody. Another important source variance is a language learner's familiarity with a specific word in the passage. For example, a language learner may stumble on a word the first time they encounter it due to the word's unfamiliarity but the $50^{th}$ encounter is likely to be less challenging.

Systems and methods for modeling of lexical experience for tracking oral reading fluency are described herein. Systems and methods herein may account for the fact that a user often does not read a book with a blank lexical slate. For example, when a user is reading a book, the within-the-book experience may be a continuation of an ongoing lexical experience that accumulates across prior reading materials and other language experiences. Systems and methods herein may model a user's prior knowledge using a background corpus with a current experience (e.g., the current book being read) viewed as an addition to the background corpus. This addition may be updated dynamically, e.g., one word at a time. For a word in a book, systems and methods herein may use a measure of surprisal at seeing this word at this location in the book-namely, the likely familiarity with the word given the starting background knowledge and the within-book experience up until the current location. Thus, an ORF monitoring system may be forgiving for errors and pauses the first one or more times a word is encounters, but less forgiving after a word has been encountered multiple (e.g., many) times.

FIG. 1 is a diagram depicting a system embodiment 100 for modeling lexical experience for tracking ORF. A surprisal engine 140 receives a background corpus 110, a book 120, and an audio 130. The background corpus 110 may represent words a user has familiarity with (or is assumed to have familiarity with) before beginning to recite a passage. The background corpus 110 may be based on existing general background corpora alone or in combination with additional personalized corpora. One example background corpus is standard frequency index (SFI), which is compiled based on estimation of word frequencies a student with 12 years of schooling might have encountered. Another example background corpus is Touchstone Applied Science (TASA), which is a subset of SFI that focuses primarily on textbooks and other materials used in the US school system sampled by readability across grade levels. TASA3 may be another example that utilizes the TASA corpus with a cutoff for up to grade 3 readability. A further example background corpus is the British National Corpus (BNC), which samples written and spoken British English from a wide range of sources from the later part of the 20th century. Yet another example background corpus is a corpus of subtitles (SUBT), which is comprised of subtitles from U.S. films and U.S. television series from 1900-2007. In some embodiments, personalized knowledge of the user's vocabulary may be included in the background corpus. For example, the words from previous books read by the particular user may be included. The book 120 may be the current book from which the user will be reciting a passage. The audio 130 may be an audio recording of the user reciting a passage of book 120.

The surprisal engine 140 generates a fluency output 150 by creating a model to calculate ORF based on the background corpus 110, the book 120, and the audio 130. The fluency output 150 may be an ORF report. The fluency output 150 may include measurements of wcpm controlling for a surprisal feature generated in surprisal engine 140. The fluency output 150 may further control for any or all of the following: text complexity, prosody, grade level of the user, and the user's progress in the book (e.g., chapter n of m chapters). The fluency output 150 may also compare the wcpm to a word-per-minute measurement of a "reading" generated by a text-to-speech synthesizer.

Figure 2:
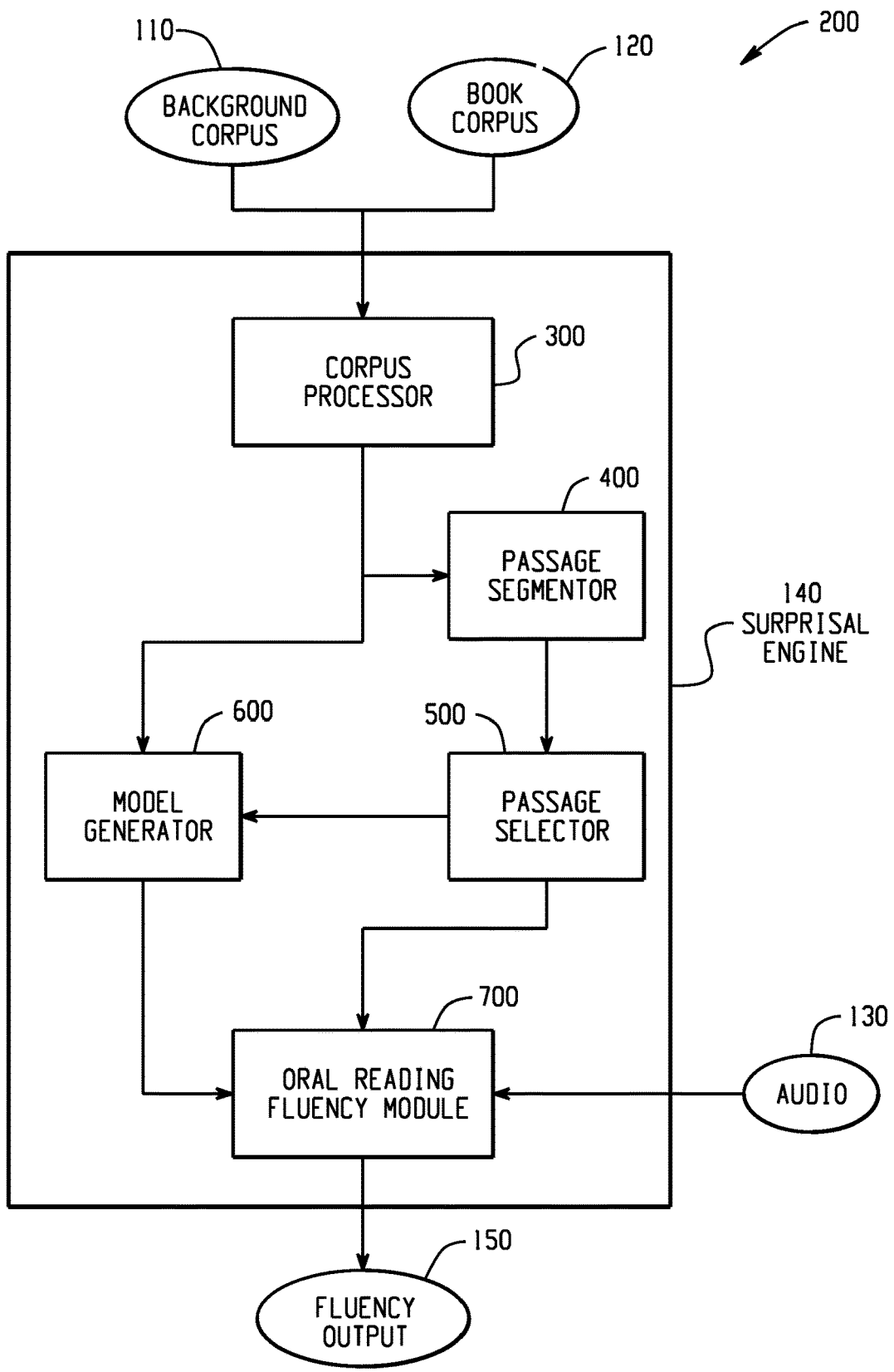
FIG. 2 is a diagram depicting example details of a surprisal engine.

FIG. 2 depicts a detailed embodiment 200 of surprisal engine 140. A corpus processor receives the background corpus 110 and book corpus 120. The corpus processor prepares the corpora for a passage segmentor 400 and model generator 600 by performing processing techniques. The passage segmentor 400 segments a processed book corpus into individual passages, which are received by a passage selector 500. The passage selector 500 selects a reading passage for the user to recite. The model generator 600 receives a processed background corpus and all the passages preceding the reading passage and generates a surprisal model. A oral reading fluency module 700 receives the audio 130, the reading passage, and the surprisal model and evaluates oral fluency. After the last word is evaluated, the oral reading fluency module 700 generates a fluency output 150.

Figure 3:
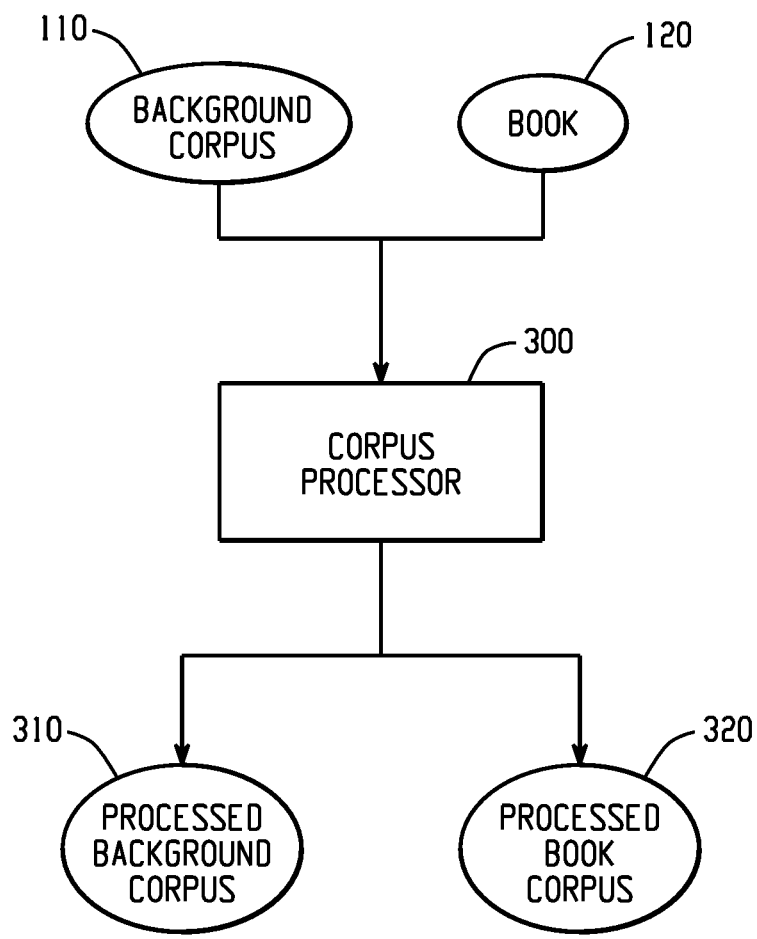
FIG. 3 is a diagram depicting example details of a corpus processor.

FIG. 3 depicts a detailed embodiment of a corpus processor 300. The corpus processor 300 receives the background corpus 110 and the book 120. In some embodiments, the corpus processor 300 may pre-process the background corpus 110 and the book 120 to normalize British/American spelling and handle contractions and hyphenation. Further, in some embodiments, the corpus processor 300 may use a tokenization process on the background corpus 110. The corpus processor 300 generates processed background corpus 310 and processed book corpus 320. The processed background corpus 310 and the processed book corpus 320 may be normalized and may comprise a sequence of tokens. In other embodiments, the background corpus 110 and the book corpus 120 may already be processed. In such instances, the system may include a corpus processor 300 such that the background corpus 110 may be processed background corpus 310 and the book corpus 120 may be processed book corpus 320.

Pre-existing unigram counts may be used for different corpora. In some embodiments, raw counts (such as for BNC and SUBT) are used. In other embodiments, a method of deriving the probability estimates from the standard frequency indices (such as for SFI and TASA corpora) using the reversed estimate-to-standard frequency transformation and the published total corpus sizes may be used. The number of tokens and number of types for each corpora is shown in FIG. 8A. A token may be an instance of a sequence of characters. A type may be the class of all tokens containing the same character sequence. The tokenization process used for generating unigram counts may differ somewhat across corpora, and, generally, the tokenization practice of a given corpus is followed when tokenizing a book as a continuation of experience following a corpus. In some embodiments, the book 120 may be viewed as an addition to the background corpus. For example, if the background corpus has 5,155,569 tokens, the first token in the book will be token number 5,155,570.

Figure 4:
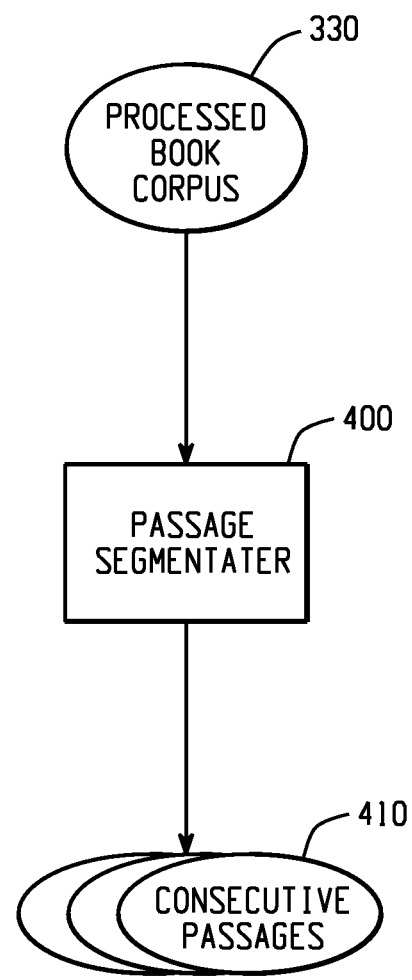
FIG. 4 is a diagram depicting example details of a passage segmentor.

FIG. 4 is a detailed diagram depicting a passage segmentor 400 embodiment. A passage segmentor 400 generates consecutive passages 410 using the processed book corpus 330. The passage segmentor 400 converts the processed book corpus 330 into a series of passages. A book may be split into consecutive passages, where each passage may have a target number of words. For example, each consecutive passage may be approximately 250 words, or about one page. However, the target number of words may be customizable. The passage segmentor 400 may add paragraphs to a passage as long as the total word count is under the target number of words. Whether the passage segmentor 400 adds the next paragraph into the passage depends on whether there is a large absolute difference from the target number of words with or without adding it. Thus, in some embodiments, passages may contain only full paragraphs. Further, in some embodiments, passages may not cross chapter boundaries. If the last passage of a chapter is very short, for example, less than 50 words, the passage segmentor may discard the passage.

Figure 5:
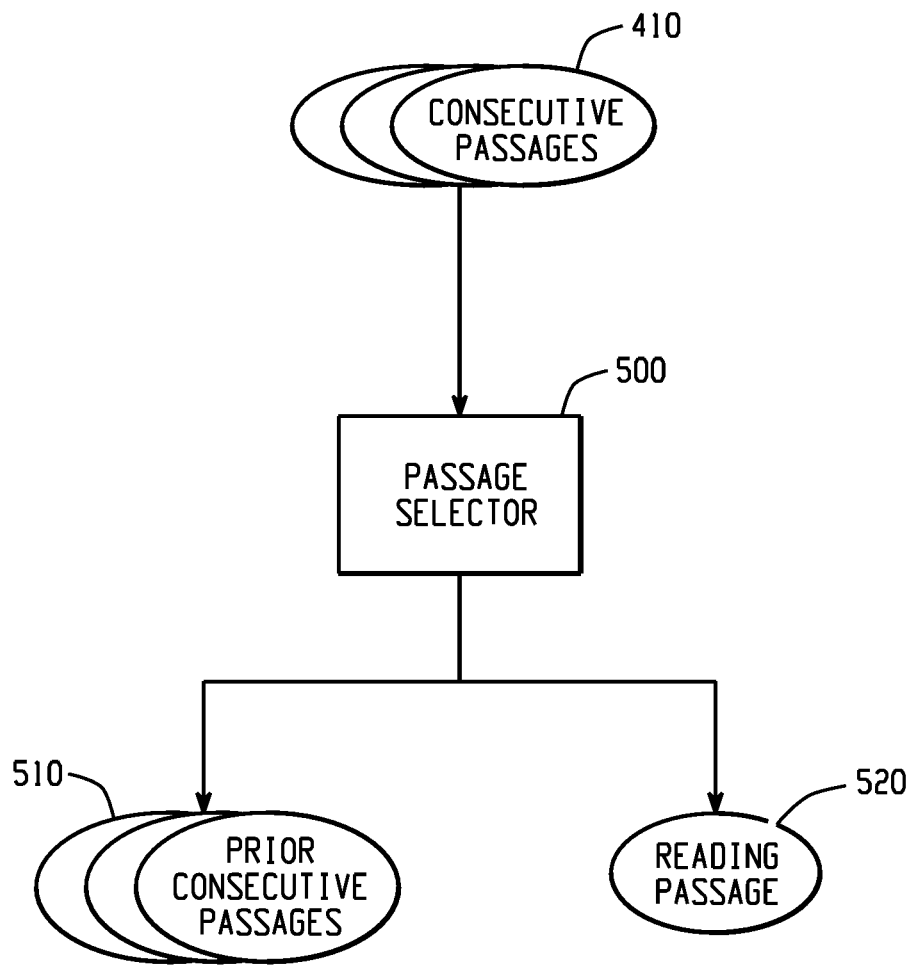
FIG. 5 is a diagram depicting example details of a passage selector.

FIG. 5 is a detailed diagram depicting a passage selector 500 embodiment. The passage selector 500 selects a reading passage 520 from the consecutive passages 410. It also generates prior consecutive passages 510. The reading passage 520 may be the next passage in the consecutive passage 410 that the user has not read. In some embodiments, a user may take turns reading aloud consecutive passages of the book 120 with a pre-recorded audio book narrator. The passage selector 500 may record the users place in the book 120 from a previous session. The prior consecutive passages 510 may be every passage in the consecutive passages 410 before the reading passage 520.

Figure 6:
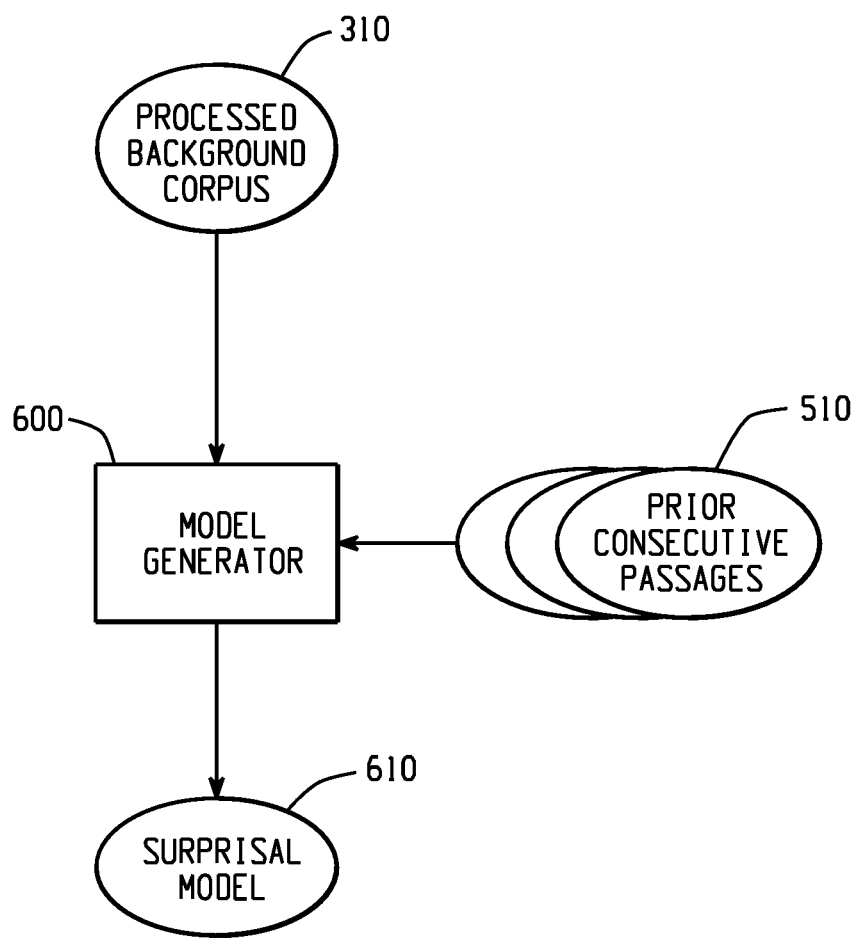
FIG. 6 is a diagram depicting example details of an model generator.

FIG. 6 is a detailed diagram of an model generator embodiment 600. The model generator generates a surprisal model 610 using processed background corpus 310 and prior consecutive passage 510. Surprisal may measure the relative unexpectedness of a word in context, such as the relationship between repetition and story location. Surprisal may measure the user's prior lexical knowledge. Surprisal may be defined as a log of inverse of probability of a word:

$$S = \log_2 \frac{1}{P(w)} \quad \text{Eq. 1}$$

where S defines the surprisal value of W=w for a random word W and P(w) is the probability of w.

The surprisal model 610 may be a surprisal model that models the user's prior knowledge using the processed background corpus 310 and the prior consecutive passages 510 of the book 120. The P (w) of Eq. 1 may be updated continuously as a user progresses through the book, token by token. In some embodiments, the surprisal model 10 may be precomputed for every word token in a story based on the text of the story and the background corpus. The surprisal model may take the background corpus, the current token of a passage and the current passage as inputs to generate an average surprisal score for the passage.

Surprisal may be the highest for a completely new word appearing the latest in a book—this is, the first occurrence in all the lexical experience thus far (the background corpus and book). In contrast, words that are generally more frequent than in the book 120 would become gradually more surprising, but the increase would be small, since a frequent word has accumulated a lot of prior occurrences and the impact of any new words is relatively small. For example, if a book generally has a lower frequency of the word "the" than the background corpus, "the" will become more surprising as one adds the book to their lexical experience, but since even a long single book is orders of magnitude shorter than a large corpus that models the background knowledge, the book will only have a small impact on the surprisal values of generally frequent words. Examples of words at different locations of Harry Potter and the Sorceror's Stone (HP) and Pinocchio that are the top 3% surprisal for the passage are shown in FIG. 9.

Figure 7:
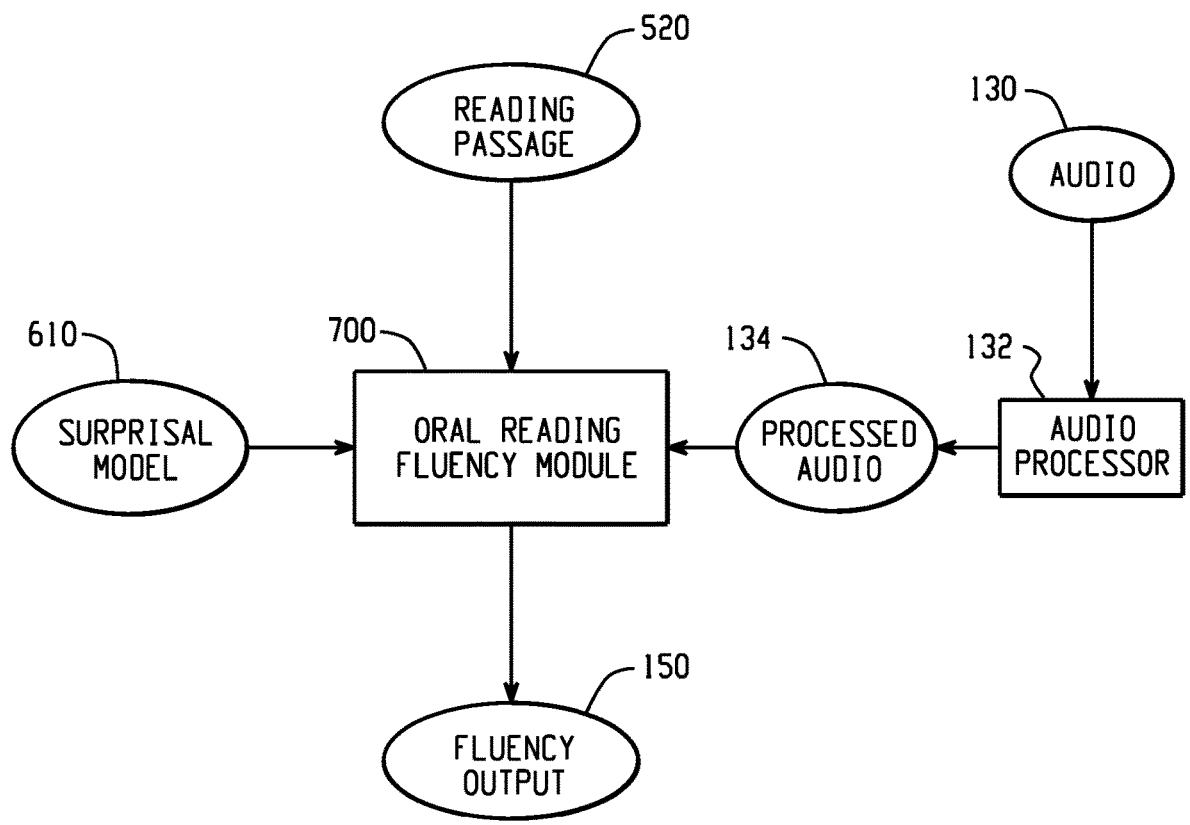
FIG. 7 is a diagram depicting example details of an oral reading fluency module.

FIG. 7 is a detailed diagram of an oral reading fluency module 700. An audio processor 132 transcribes the audio 130 and generates processed audio 134. The audio processor 132 may contain automatic transcription software. The transcription may also be conducted by a professional agency. The transcription of audio 130 may indicate any deletions, substitutions, and insertions from the text of the reading passage 520. The audio processor 132 may also tokenize and normalize the transcribed audio. The processed audio 134 may be a plurality of tokens based on the audio 130. The oral reading fluency module 700 may receive the reading passage 520, the surprisal model 610, and the processed audio 134. The oral reading fluency module evaluates each token of the processed audio 134 against each token in the reading passage. The surprisal model 10 may generate a surprisal score for each token in the reading passage.

A fluency output 150 may be generated by the oral reading fluency module 700. The 520 fluency output 150 may be an ORF report. It may include feedback solely on the reading passage the user recited, or it may include feedback based on the reading passage and previous passages recited by the user. The fluency output 150 may be evaluated based on the surprisal model and a baseline model measuring wcpm. The wcpm may be modeled as a combination of passage, user random effects, and a number of fixed effects. The fixed effects may include the grade level of the user (to capture any systematic differences between grades), a text complexity score (TE), a words-per-minute measure of a "reading" generated using a text-to-speech synthesizer to model variation in duration of different phonemes and reasonable inter- and intra-sentential pausing (TTS), and the number of the chapter the passage is in. Surprisal is another example of a fixed effect. The fluency output may be stored in a computer readable medium. A next reading passage may be selected for the user to recite or the user's spot in the book may be saved.

To demonstrate the effects of surprisal on ORF reports, two example books were used to conduct studies. FIG. 8A is a table depicting the number of tokens and the number of types for various background corpora. FIG. 8B is a table depicting descriptive passage statistics for two example books: HP and Pinocchio. The statistics include the number of chapters in each book, the number of passages created for each book based on a target number of words per passage of 250, and the mean length of each passage. In these example passage segmentations, four chapter final passages were discard for HP, and three were discarded for Pinocchio. FIG. 9 is a table showing words above the 97% cut-off for three passages in the beginning, middle, and end of HP and Pinocchio, including surprisal estimates for each word using SFI as the background corpus. Generally, the words in each example passage capture invented or rare vocabulary.

Figure 11A:
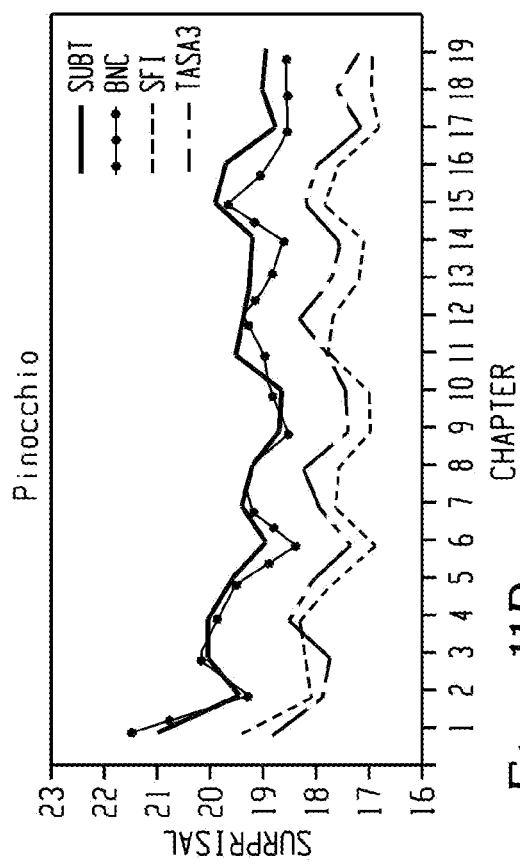
FIG. 11A is a chart depicting the average surprisal values per chapter across background corpora for Harry Potter and the Sorcerer's Stone.
Figure 11B:
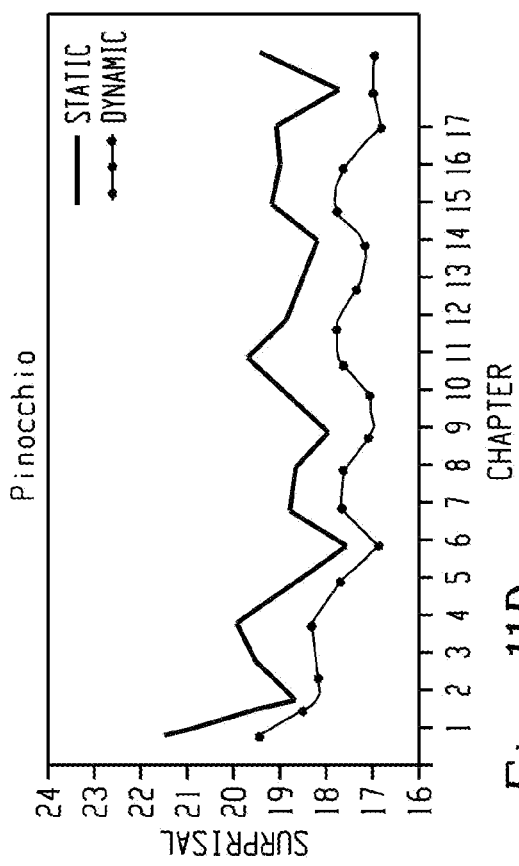
FIG. 11B is a chart depicting the average surprisal values per chapter across background corpora for Pinocchio.

FIG. 10 is a table depicting the Pearson's correlations between the surprisal measures and the serial number of the passage in the book, where HP is shown first in each cell and Pinocchio is shown second. This table illustrates that, generally, surprisal trends downwards as one moves through a book. FIG. 11A-B depicts graphs for average surprisal values per chapter across background corpora for HP and Pinocchio. FIGS. 11A-B exemplifies the generally downward trend of surprisal and shows that the corpora are in agreement regarding the general trajectories even if the exact estimates of surprisal are different. Further, surprisal values are generally higher for the larger corpora, since occurrence of new words is more surprising with more background experience. Interestingly, for HP, it is not the case that Chapter 1 is consistently more surprising than the rest. For example, Chapter 5, where the main character Harry is introduced to Diagon Alley and the wizarding world, and Chapter 7, where Harry arrives at his new wizarding school and goes through the sorting process, are more surprising. This makes sense with respect to the story—while some of the "normal" characters, like his family, are introduced in Chapter 1, it is not until Chapter 5 that the immersion in a very different, magic world happens, which is accompanied by a lot of rare or invented vocabulary related to magic artifacts (Chapter 5) and houses, teachers, and classes in a school of magic (Chapter 7). Chapter 11 stands out with vocabulary describing the invented favorite wizarding sport, Quidditch. In contrast, the pattern for Pinocchio does show a dramatic drop after Chapter 1, with additional minor ups and downs later in the story.

Figure 11C:
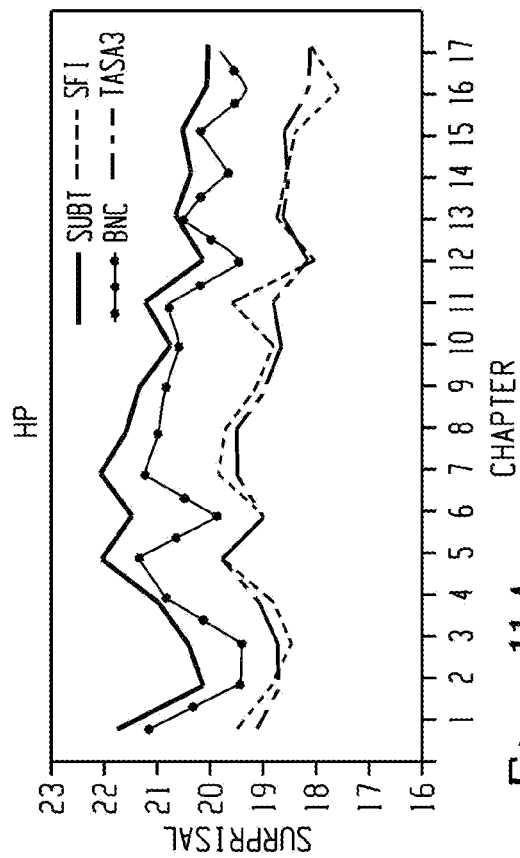
FIG. 11C is a chart plotting the dynamic and static surprisal calculations for Harry Potter and the Sorcerer's Stone.
Figure 11D:
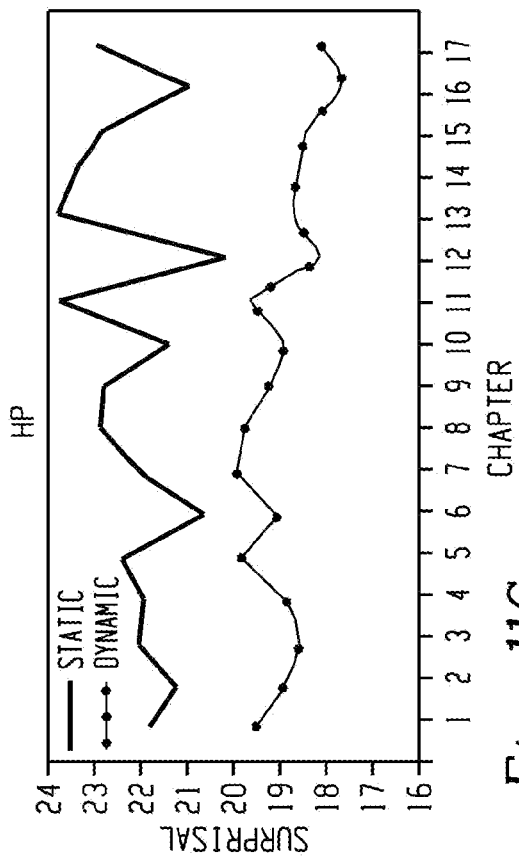
FIG. 11D is a chart plotting the dynamic and static surprisal calculations for Pinocchio.

FIGS. 11C-D are graphs plotting the 97-percentile measure using the SFI background corpus for HP and Pinocchio. FIGS. 11C-D depict the difference between the "dynamic" measures discussed and a "static" surprisal calculation based on the background corpus only, without the dynamic recalculation following the token-by-token reading experience. Without accounting for the within-book experience, some later chapters in HP have extremely high surprisal scores, such as Chapters 13 and 14. The dynamic index shows, in contrast, that by that point in the story, life in a school of magic is somewhat business-as-usual, with these chapters being part of the general downward trajectory. The discrepancy between the static and dynamic measures for the later HP chapters is such that the overall correlation with book location is actually positive for the static 97-percentile measure for all background corpora, in contrast to the universally negative correlations reported in FIG. 10 for the dynamic measures.

An example study based on some embodiments discussed above was conducted to obtain oral reading data. The oral reading data came from 35 students in grade 4 (12) and grade 5 (23). Students read with an ORF application for up to 19 weeks, approximately three times a week for 29 minutes at a time. All the students read and finished HP. The students used consumer-level in-ear headphones with a built-in microphone. The students took turns reading aloud consecutive passages of the book with a pre-recorded audiobook narrator. When splitting the text of a chapter into reading turns, the algorithm for segmenting data discussed above was utilized with a target of 150 words per student turn and 200 words per narrator turn. A set of 1,529 recordings with as many readers as possible per passage that span the beginning, middle, and end of each of the chapters were selected for analysis—67 passages in total with 100-170 words per passage. Transcribers from a professional agency were used to transcribe the audio recordings.

Based on these recordings, ORF reports were generated. One set of reports includes surprisal, to evaluate whether surprisal explains additional passaged-based variance in wcpm above and beyond baseline predictors. A baseline model was also used, which modeled a combination of passage and student random effects and a number of fixed effects. The fixed effects include the grade level of the student, text complexity score, words-per-minute measurement of a "reading" generated by Apple's text-to-speech synthesizer, and the number of the chapter the passage is in. The coefficient of the chapter variable captures the average extent of improvement in oral reading fluency per chapter. Chapter may also be used as a random slope to allow for different growth rates across participants. The surprisal model is identical to the Baseline model but has an additional fixed effect—the standard deviation of surprisal values per passage using the TASA3 corpus as background.

FIG. 12 depicts a table showing the differences in results between the baseline model and surprisal model. The baseline model may be specified using lmer syntax in Eq. 2; the coefficients are shown in the "baseline" column of FIG. 12. The same coefficients are used in the "+Surprisal" column of FIG. 12 with the inclusion of a Surprisal coefficient. The results illustrate that surprisal is a significant predictor of wcpm, after controlling for complexity and prosody, with large surprisal values corresponding to slower reading. The Baseline model put the amount of passage-based unexplained variance at 22.4; the number is reduced to 13 in the Baseline+Surprisal model, a reduction of 42%. The estimated rate of growth is also reduced from 1.27 additional wcpm per chapters to 1.09. This extent of growth is predicted after controlling for the within-book repetition of key book-specific vocabulary, so it might allow for a better estimate of the more generalized part of the growth in fluency.

Figure 13:
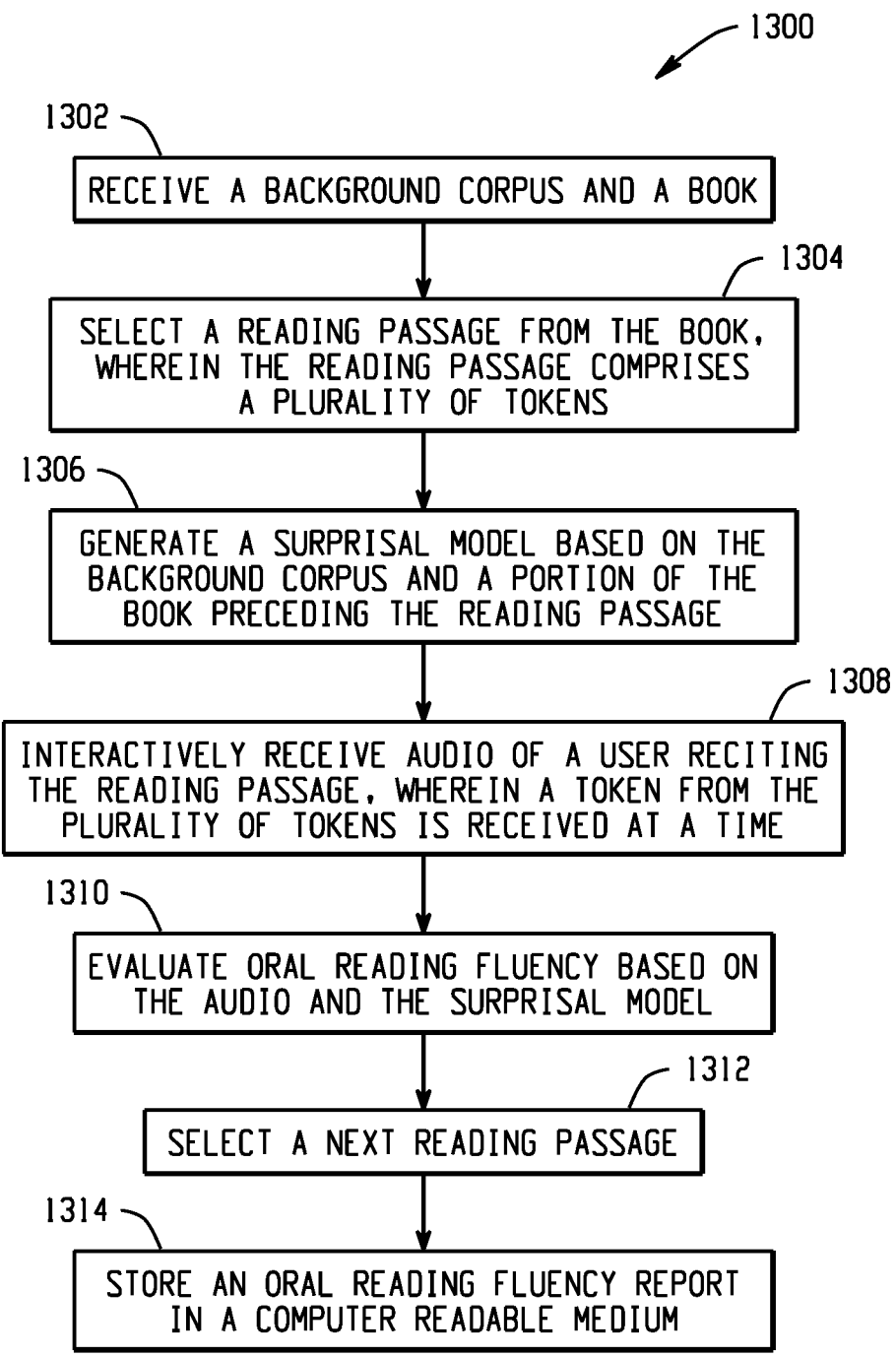
FIG. 13 is a flow diagram depicting an example method for modeling lexical experience for tracking oral reading fluency.

FIG. 13 is a flow diagram depicting an example method for modeling lexical experience for tracking oral reading fluency. At 1302, a system receives a background corpus and a book. At 1304, the system selects a reading passage from the book, wherein the reading passage comprises a plurality of tokens. At 1306, the system generates a surprisal model based on the background corpus and a portion of the book preceding the reading passage. At 1308, the system interactively receives audio of a user reciting the reading passage, wherein a token from the plurality of tokens is received at a time. At 1310, the system evaluates oral reading fluency based on the audio and the surprisal model. At 1314, the system selects a next reading passage. At 1314, the system stores an oral reading fluency report in a computer readable medium.

The methods and systems described herein may be implemented using any suitable processing system with any suitable combination of hardware, software, and/or firmware, such as described below with reference to the non-limiting examples of FIGS. 14A, 14B, and 14C.

Figure 14A:
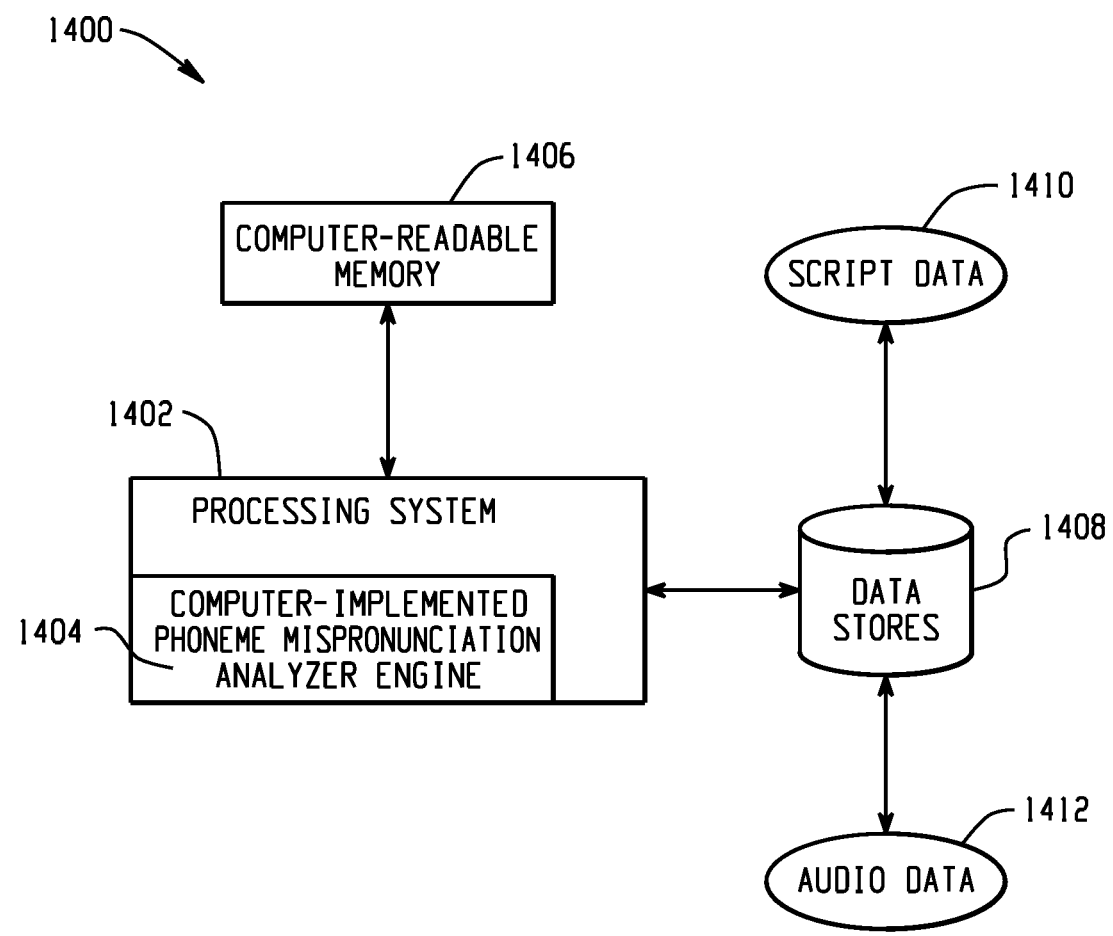
FIGS. 14A, 14B, and 14C are flow diagrams depicting example systems for implementing the approaches described herein for modeling lexical experience for tracking oral reading fluency.
Figure 14B:
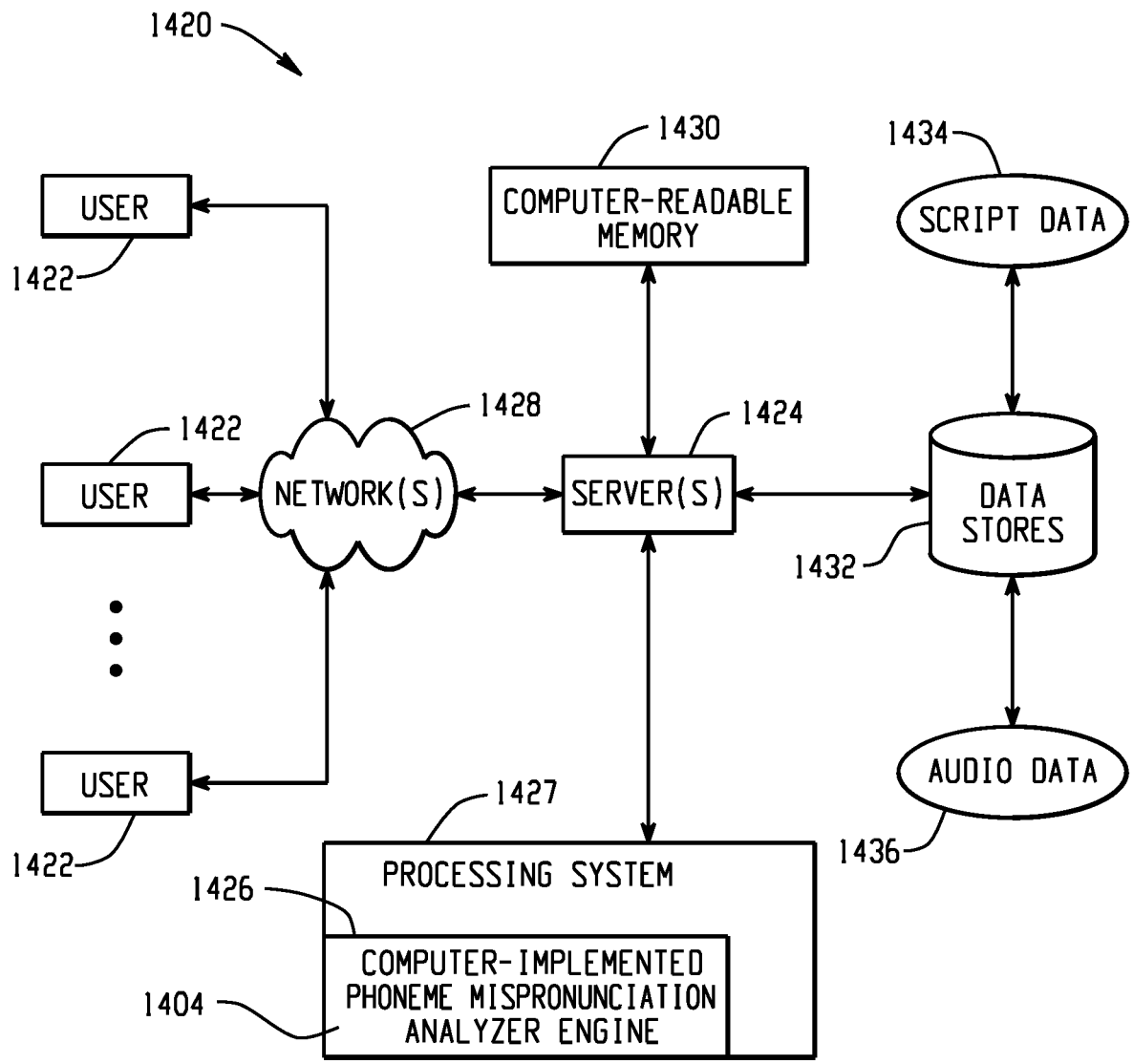
Figure 14C:
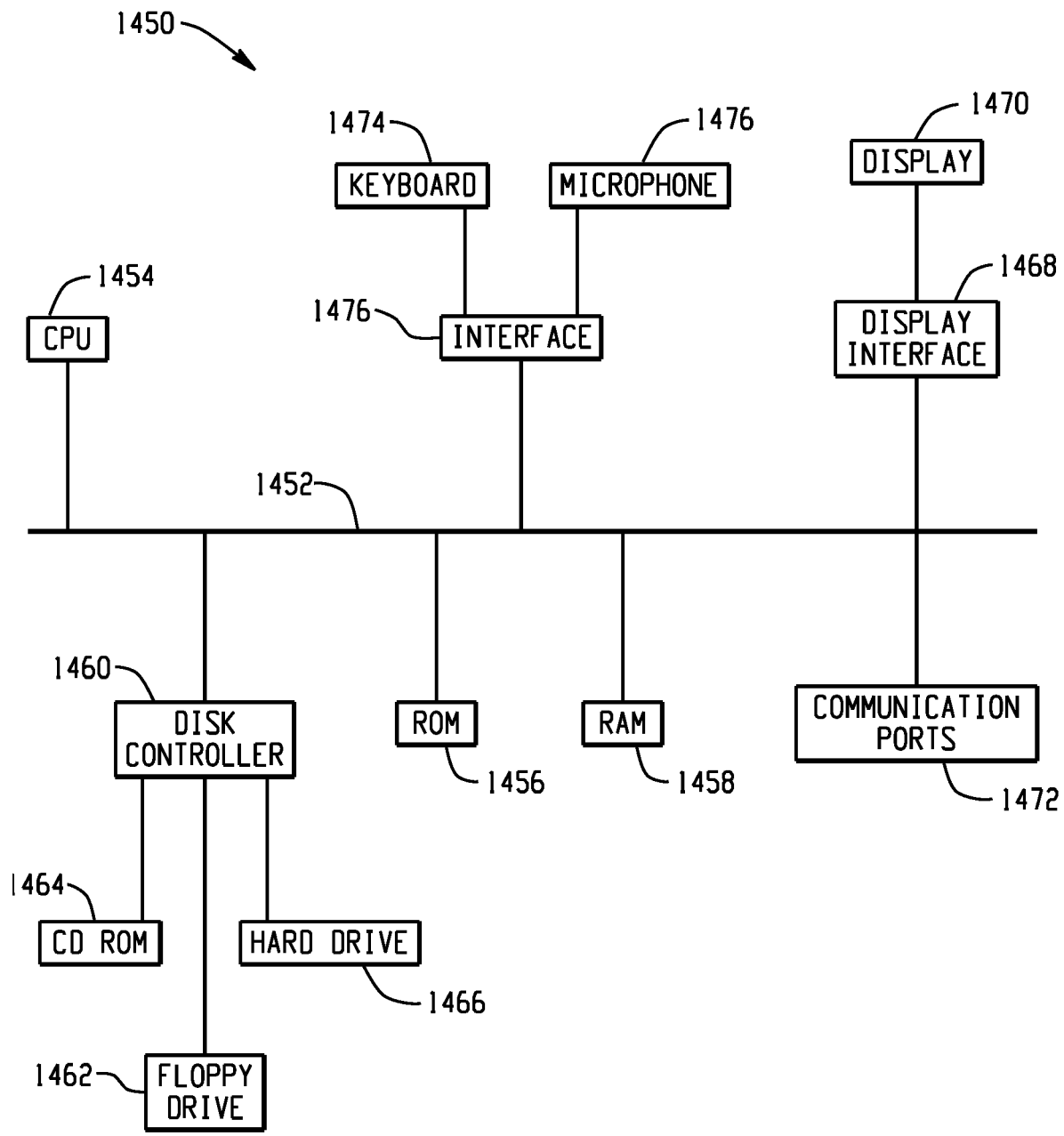

FIGS. 14A, 14B, and 14C depict example systems for use in implementing a system. For example, FIG. 14A depicts an exemplar system 1400 that includes a standalone computer architecture where a processing system 1402 (e.g., one or more computer processors) includes a computer-implemented phoneme mispronunciation analyzer engine 1404 being executed on it. The processing system 1402 has access to a non-transitory computer-readable memory 1406 in addition to one or more data stores 1408. The one or more data stores 1408 may contain script data 1410 as well as audio data 1412.

FIG. 14B depicts a system 1420 that includes a client server architecture. One or more user PCs 1422 accesses one or more servers 1424 running a system 1426 on a processing system 1427 via one or more networks 1428. The one or more servers 1424 may access a non-transitory computer readable memory 1430 as well as one or more data stores 1432. The one or more data stores 1432 may contain script data 1434 as well as audio data 1436.

FIG. 14C shows a block diagram of exemplary hardware for a standalone computer architecture 1450, such as the architecture depicted in FIG. 14A, that may be used to contain and/or implement the program instructions of system embodiments of the systems and methods herein. A bus 1452 may serve as the information highway interconnecting the other illustrated components of the hardware. A processing system 1454 labeled CPU (central processing unit) (e.g., one or more computer processors) may perform calculations and logic operations required to execute a program. A non-transitory computer-readable storage medium, such as read-only memory (ROM) 1456 and random access memory (RAM) 1458, may be in communication with the processing system 1454 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal or a modulated carrier wave, e.g., such that the instructions may be then be stored on a non-transitory computer-readable storage medium.

A disk controller 1460 interfaces one or more optional disk drives to the system bus 1452. These disk drives may be external or internal floppy drives such as 1462, external or internal CD-ROM, CD-R, CD-RW or DVD drives such as 1464, or external or internal hard drives 1466. As indicated previously, these various disk drives and disk controllers are optional devices.

Each of the element managers, real time data buffer, conveyors, file input processor, database index shared access memory loader, reference data buffer, and data managers may include a software application stored in one or more of the disk drives connected to the disk controller 1460, the ROM 1456, and/or the RAM 1458. Preferably, the process 1454 may access each component as required.

A display interface 1468 may permit information from the bus 1456 to be displayed on a display 1470 in audio, graphic, or alphanumeric format. Communication with external devices may optionally occur using various communication ports 1472.

In addition to the standard computer-type components, the hardware may also include data input devices, such as a keyboard 1474 or other input device 1476, such as a microphone, remote control, pointer, mouse, and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores, and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A computer-implemented method for modeling lexical experience for tracking of oral reading fluency comprising:
  receiving a background corpus and a text, wherein the background corpus comprises general background corpora and personalized corpora from passages that a user has read;

selecting a reading passage from the text, wherein the reading passage comprises a plurality of reading passage tokens;
generating a surprisal model based on the background corpus and a portion of the text preceding the reading passage to calculate a probability of a particular next token of the reading passage;
iteratively receiving audio of the user reciting the reading passage, wherein a token of audio from a plurality of audio tokens is received at a time;
evaluating oral reading fluency based on the audio, the reading passage, and the surprisal model by comparing the plurality of audio tokens to the plurality of reading passage tokens in view of the calculated probability of each token of the plurality of reading passage tokens;
selecting a next reading passage; and
storing an oral reading fluency report in a computer readable medium.

2. The method of claim 1, wherein evaluating oral reading fluency further comprises using a baseline model.

3. The method of claim 2, wherein the baseline model measures words read correctly per minute of oral reading, text complexity, genre, prosody, or local discourse structure.

4. The method of claim 1, further comprising:
processing the background corpus and the text by tokenizing the background corpus and the text.

5. The method of claim 1, further comprising:
processing the audio which comprises:
  transcribing the audio into a transcription using a speech to text transcriber; and
  tokenizing the transcription.

6. The method of claim 1, wherein the background corpus and the text are pre-processed to normalized spelling and handle contractions and hyphenation.

7. The method of claim 1, wherein the probability of the particular next token is continuously updated, token by token, as the user progresses through the reading passage.

8. The method of claim 1, wherein the surprisal model calculates a surprisal value of the particular next token based on a logarithm of an inverse of the probability of the particular next token.

9. The method of claim 7, wherein the surprisal value is precomputed for every token in the reading passage.

10. The method of claim 1, further comprising:
providing the selected reading passage and the selected next reading passage to the user via a user interface.

11. A system for modeling lexical experience for tracking of oral reading fluency comprising:
a processing system comprising one or more data processors; and
a computer-readable medium encoded with instructions for commanding the processing system to execute steps comprising:
  receiving a background corpus and a text, wherein the background corpus comprises general background corpora and personalized corpora from passages that a user has read;
  selecting a reading passage from the text, wherein the reading passage comprises a plurality of reading passage tokens;
  generating a surprisal model based on the background corpus and a portion of the text preceding the reading passage to calculate a probability of a particular next token of the reading passage;
  iteratively receiving audio of the user reciting the reading passage, wherein a token of audio from a plurality of audio tokens is received at a time;
  evaluating oral reading fluency based on the audio, the reading passage, and the surprisal model by comparing the plurality of audio tokens to the plurality of reading passage tokens in view of the calculated probability of each token of the plurality of reading passage tokens;
  selecting a next reading passage; and
  storing an oral reading fluency report in a computer readable medium.

12. The system of claim 11, wherein evaluating oral reading fluency further comprises using a baseline model.

13. The system of claim 12, wherein the baseline model measures words read correctly per minute of oral reading, text complexity, genre, prosody, or local discourse structure.

14. The system of claim 11, wherein the steps further comprise:
processing the background corpus and the text by tokenizing the background corpus and the text.

15. The system of claim 11, wherein the steps further comprise:
processing the audio which comprises:
  transcribing the audio into a transcription using a speech to text transcriber; and
  tokenizing the transcription.

16. The system of claim 11, wherein the background corpus and the text are pre-processed to normalize spelling and handle contractions and hyphenation.

17. A non-transitory computer-readable medium encoded with instructions for commanding one or more data processors to execute steps of a method for modeling lexical experience for tracking of oral reading fluency comprising:
receiving a background corpus and a text, wherein the background corpus comprises general background corpora and personalized corpora from passages that a user has read;
selecting a reading passage from the text, wherein the reading passage comprises a plurality of reading passage tokens;
generating a surprisal model based on the background corpus and a portion of the text preceding the reading passage to calculate a probability of a particular next token of the reading passage;
iteratively receiving audio of the user reciting the reading passage, wherein a token of audio from a plurality of audio tokens is received at a time;
evaluating oral reading fluency based on the audio, the reading passage, and the surprisal model by comparing the plurality of audio tokens to the plurality of reading passage tokens in view of the calculated probability of each token of the plurality of reading passage tokens;
selecting a next reading passage; and
storing an oral reading fluency report in a computer readable medium.

18. The non-transitory computer-readable medium of claim 17, wherein evaluating oral reading fluency further comprises using a baseline model.

19. The non-transitory computer-readable medium of claim 18, wherein the baseline model measures words read correctly per minute of oral reading, text complexity, genre, prosody, or local discourse structure.

20. The non-transitory computer-readable medium of claim 17, wherein the steps further comprise;
processing the background corpus and the text by tokenizing the background corpus and the text.

21. The non-transitory computer-readable medium of claim 17, wherein the steps further comprise:
processing the audio which comprises:

transcribing the audio into a transcription using a speech to text transcriber; and tokenizing the transcription.

22. The non-transitory computer-readable medium of claim 17, wherein the background corpus and the text are pre-processed to normalize spelling and handle contractions and hyphenation.

\* \* \* \* \*